(12) United States Patent
Thiagarajan et al.

(10) Patent No.: US 9,361,633 B1
(45) Date of Patent: Jun. 7, 2016

(54) DETERMINING PRESENT VENUE FOR A USER DEVICE

(71) Applicant: AMAZON TECHNOLOGIES, INC., Reno, NV (US)

(72) Inventors: Arvind Thiagarajan, Cambridge, MA (US); David George Butler, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/077,010

(22) Filed: Nov. 11, 2013

(51) Int. Cl.
*G06Q 30/00* (2012.01)
*G06Q 30/02* (2012.01)

(52) U.S. Cl.
CPC .................................. *G06Q 30/0261* (2013.01)

(58) Field of Classification Search
CPC .... G06Q 30/02; G06Q 30/06; G06Q 30/0623

USPC ......................................................... 705/14.1
See application file for complete search history.

(56) References Cited

U.S. PATENT DOCUMENTS

2013/0275268 A1* 10/2013 Wright ........................ 705/26.61
2013/0322401 A1* 12/2013 Visuri ................... H04W 48/16
370/331

\* cited by examiner

*Primary Examiner* — Daniel Lastra
(74) *Attorney, Agent, or Firm* — Lindauer Law, PLLC

(57) ABSTRACT

A user device acquires identifiers and signal strengths corresponding to detectable wireless devices. The user device associates one or more of the identifiers with one or more venues, assigning a confidence value to each association. A score value is also assigned to each association based on the signal strengths and the confidence values. One of the associations is selected based on the score values, and is designated as the most likely venue where the user device is located. Information may be accessed or requested, or one or more operations may be performed, in accordance with the most likely venue.

20 Claims, 11 Drawing Sheets

DETERMINING PRESENT VENUE FOR A USER DEVICE

BACKGROUND

It is desirable to provide particular information or target certain services to a user device based on the device's present location. Methods and apparatus for accurately determining user device location are continually sought after.

BRIEF DESCRIPTION OF DRAWINGS

FIG. 1 depicts views including user devices and elements used to determine most likely venues where user devices are located or proximate to.

Figure 1:
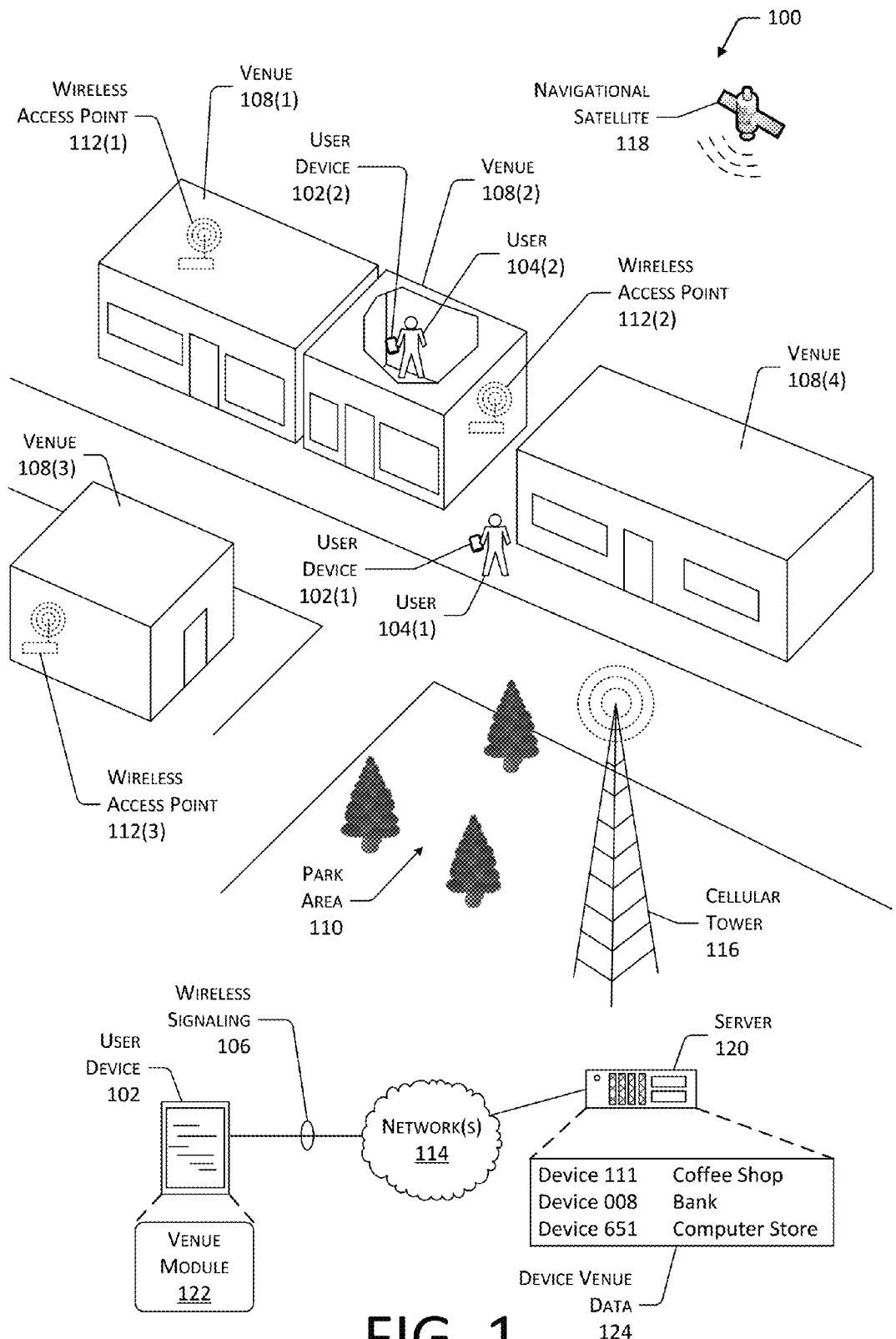

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

User devices having portable form-factors are employed for various purposes. Cellular telephones, tablet computers, wearable computers, media access or viewing devices, e-book readers, and the like are just a few examples. Such user devices perform various respective functions and are designed to be used in a mobile manner.

The location of a user device may be automatically determined using navigational satellite signaling, cellular network data, inertial navigation resources accessible to the user device, or by other suitable techniques. Such a location may be a latitude and longitude, a street address, a rural route number, or other format or location-conveying information. Location information is usually approximate in nature and subject to some margin of error, such that an exact location is not known. While a user may obtain a more precise location based on signage, landmarks, or other cues in the environment about them, such a process is tedious and requires that such information be manually entered into a user device in order to perform corresponding operations.

Moreover, it may be desirable to identify the venue of a user device with respect to a particular business, government office, and so forth. A venue comprises a premises at which a particular activity or type of activity may take place. Venues may include concert halls, stadiums, restaurants, shops, gas stations, libraries, parking facilities, and so forth. Some venues, such as a chain of coffee shops, may be located at several different locations.

Users often seek information or services related to the venue they are presently visiting. For example, a user within a restaurant may wish to view their menu while waiting to be seated. In yet another example, a user within a venue such as a public library or a bookstore may receive information about bestsellers which are available. From another perspective, those operating a particular venue may wish to provide various kinds of information to their visitors, or offer certain services or assistance. In one such example, a clothing retailer may want to inform visiting customers regarding presently offered sales items. Such information or services may be provided by way of respective user devices.

Automatically determining the specific venue where a user device is located makes possible the timely or opportune provisioning of related information or services. For example, a menu may be uploaded or made accessible to an e-book reader once it is determined that the device is within the corresponding restaurant. In another example, knowing the user is in a clothing store may result in presentation on a display of the user's tablet computer of advertisements for other clothing stores or accessories. In yet another example, travel related information and services may be provided to a smart phone after entry into an airport or train station. These and numerous other operations may be performed without a user having to identify or manually input their present venue.

An approximate location for a user device may be determined using global navigation satellite system (GNSS), cellular signaling, internal navigation resources, or other techniques. The user device may then issue a request for information regarding proximate venues and their respective names to a server or other computing device by way of wireless signaling. Such a request may include the present location, as well as a distance or range about that location defining an area or spatial region of interest. Alternatively, the user device may access venue information stored therein within a data structure, identifying venues within an area about the current location.

The user device may acquire, or survey, respective wireless access points that are detectable thereabout. A signal strength value and an identifier—such as a service set identifier (SSID)—are acquired for each of the detected wireless access points. The user device may then attempt to match the identifiers against the respective venues received from a responding server, or acquired by data structure lookup.

Thus, the user device may survey the detectable "radio frequency (RF) space" to determine what wireless access points are nearby. Such a survey may be performed without determination of a present location, and may be done as an initial step toward identifying a venue or venues of particular interest for which other actions may be performed.

The user device identifies one or more characters, strings or other portions of interest within each of the identifiers and matches these against corresponding portions within the respective venue names. In another example, the user device may match one or more previously known identifiers against one or more venues. Heuristic comparisons, pattern matching, or other techniques may also be used to associate one or more of the identifiers with one or more of the venues.

The user device may assign a respective confidence value or metric to each of the identifier/venue associations. Each confidence value is based on the extent or intersection of the matches made between the respective identifiers and the venue names, or respective portions thereof. In this way, the certainty or probability of each respective association is quantified. A higher confidence value corresponds to a greater certainty of the corresponding association.

The user device may assign a score value to each of the associations based on the confidence value and the signal strength values. In one instance, each score value is equal to the mathematical product of the corresponding confidence value and signal strength. Other scoring techniques or methods may also be used. The user device then selects one of the score values—usually, the greatest value—as corresponding to the most likely venue where the user device is presently located. The user device may then issue a wireless request for information or services particular to the most likely venue, trigger the display of previously acquired information, or perform other operations accordingly.

In another implementation, the user device determines an approximate location and acquires signal strengths and identifiers for detectable wireless signals thereabout. This information is then provided to a server or other service device by wireless signaling, which determines and communicates the most likely venue back to the user device. Thus, the bulk of the computational efforts are performed by the server and the user device performs a less complex roll. Information related to the most likely venue, advertising, maps or access data, and numerous other kinds of matter may be communicated to the user device, or services provided by the most likely venue may be accessed, accordingly. Respective variations on the foregoing may also be used in accordance with the methods, devices and systems described herein.

FIG. 1 depicts views 100 including particular elements and operations performed by each. The views 100 are illustrative and non-limiting in nature, and other elements, devices, systems or respective operations are also contemplated.

A user device 102(1) is associated with a user 104(1). As depicted, the user device 102(1) is a tablet computer having a portable form-factor and configured to perform various operations in accordance with executable program code. Other user device 102 types or configurations, such as e-book readers, smart phones, wearable computers, laptop computers, and so forth, may also be used. The user device 102(1) is also configured to communicate with other devices and systems using wireless signaling 106. Thus, the user 104(1) may operate the user device 102(1) in a mobile manner, performing various operations in respective locations and at various times.

Also depicted are respective venues 108(1)-108(4). Each of the venues 108 may be a private, commercial, or government location, or some other type of establishment. For non-limiting illustration, the venue 108(1) may be a computer retailer, the venue 108(2) may be a coffee shop, the venue 108(3) may be a banking establishment, and the venue 108(4) may be a government services office. Other respective venue 108 identities or types may also be considered. Further depicted is a park area 110, which may also be considered a form of venue 108.

Respective wireless access points 112(1)-112(3) are also depicted associated with the venues 108(1)-108(3), respectively. The wireless access points 112(1)-112(3) may be configured to operate using one or more established wireless signaling protocols, such as those in accordance with the Institute of Electrical and Electronics Engineers (IEEE) standard 802.11. In one implementation, each wireless access point 112 is configured to communicate with respective user devices 102 within a relatively close range, such as about 20 meters or so. Other signaling protocols or operating ranges may also be used.

Thus, each wireless access point 112(1)-112(3) is associated with, or representative of, the respective venue 108(1)-108(3) within which it is located. Each wireless access point 112 is configured to couple or link one or more respective user devices 102 with one or more networks 114 by way of wireless signaling 106. Non-limiting examples of such networks 114 include the Internet or access thereto, local-area networks (LANs), wide-area networks (WANs), and so forth Also depicted is a cellular tower 116 configured for bidirectional communication with correspondingly equipped user devices 102. Thus, cellular phones, smart phones, some tablet computers, and the like may utilize cellular communications or access various computer-based services by way of the cellular tower 116. Further depicted is a navigational satellite 118. The navigational satellite 118 may be part of a global navigation satellite system (GNSS) configured to provide wireless signals used by respective user devices 102 in determining their present geographic locations. The GNSS may include the Global Positioning System (GPS) operated by the United States of America, GLONASS operated by the Russian Federation, Compass operated by the People's Republic of China, Galileo operated by the European Union, Indian Regional Navigational Satellite System (IRNSS) operated by the Republic of India, and so forth.

Further depicted is a server 120 configured to perform various operations in accordance with an executable program code. The server 120 is also connected to the one or more networks 114 such that the user device 102 may communicate therewith by way of wireless signaling 106. The server 120 may also be configured to perform one or more operations related to determining specific venues 108 where respective user devices 102 are located (or are proximate to).

An illustrative operation is as follows: a user 104(2) operates a user device 102(2), such as a tablet computer, having both wireless and GNSS locating capabilities. The user device 102(2) may operate a locating program as a background application. The locating program causes the user device 102(2) to determine its location by way of signaling from a plurality of navigational satellites 118. The user device 102(2) then issues a request to the server 120 for information regarding nearby or proximate venues 108. Such a request is communicated by way of wireless signaling 106 with the wireless access point 112(2), and includes the just-determined location and a predetermined distance value. For example, the user device 102(2) may request a listing of venues 108 and their respective names within 125 feet of the present location.

The server 120 responds to the request by accessing venue information stored within a data structure, selecting information for those venues 108 consistent with the location and distance or proximity criteria provided by the user device 102(2). The server 120 then communicates the venue information back to the user device 102(2) by way of wireless signaling 106.

The user device 102(2) receives the information from the server 120 and then acquires, or surveys, detectable wireless access points 112 by way of respective wireless signaling 106. Signal strength values are measured, and identifiers for each of the detectable wireless access points 112 are also determined. In the present example, it is assumed that the wireless access points 112(1), 112(2) and 112(3) are detectable, such that three respective signal strength and identifier data pairs are acquired.

A venue module 122 of the user device 102(2) then identifies one or more portions of interest within each of the three identifiers. For example, each identifier is parsed such that one or more characters, text strings, or other portions or elements are identified or designated. These respective identifier portions are then compared with portions of the venue names for the venues 108 in the interest of detecting character, string, word, or other heuristic matches. Respective identifiers are associated with respective venues 108 based on these matching or heuristic operations, such that one or more identifier/venue associations are made.

From one perspective, identifier/venue matches or associations are made by treating the selected identifier elements or portions, and selected portions of the venue names, as respective logical sets. Intersections, unions, or other commonalities are then sought between these respective sets in accordance with logical or mathematical theory. That is, common memberships between the respective sets are searched for and identified. Therefore, various automated matching operations may be performed using known logic methods or other heuristic techniques.

In the present example, three respective associations are made such that the wireless access points 112(1), 112(2) and 112(3) identifiers are associated with three venues 108(1), 108(2) and 108(3), respectively. The venue module 122 then assigns a confidence value or metric to each of the associations in accordance with the extent or success of the respective matching operations. That is, the more thoroughly the portion or portions of a given identifier match a portion or portions of the associated venue name for the venue 108, the greater the resulting confidence value. Thus, each confidence value quantifies the likelihood that the corresponding association is correct.

The venue module 122 of the user device 102 then assigns score values to each of the associations based on a weighting or heuristic scheme. In one instance, the corresponding signal strength and the confidence value for a given association are multiplied together and the resulting product is the score value for that association. That is to say: Score Value=(Signal Strength)×(Confidence Value). Other schemes or heuristic evaluation methods may also be used. The venue module 122 then selects the greatest one of the score values and designates it as the most likely venue where the user device 102(2) is presently located. In the present example, it is assumed that the association including the venue 108(2) received the greatest of the three respective score values, and is selected as the most likely venue.

Concluding the present example, the user device 102(2) establishes communication with the wireless access point 112(2), corresponding to the most likely venue 108(2). The user device 102(2) then issues a request for related information or services offered by the venue 108(2)—in this case, a coffee shop—to a network 114 associated with the wireless access point 112(2). The user device 102(2) may receive a response including a menu of offered beverages or food items, coupons or notices for daily specials, access to an online shopping website hosted by the venue 108(2), and so forth.

The user device 102(2) may also communicate or identify the most likely venue 108(2) as its present location to the server 120. The server 120 may maintain a listing of device venue data 124 indicating the instantaneous venues 108 where respective user devices 102 are located. The server 120 may use this information to periodically provide new or updated information related to the respective venues 108, or for other purposes. In one example, a user device 102 is located within the bank of venue 108(3). The server 120 may note that the bank is going to close in 10 minutes, and send an alert message to that effect to the corresponding user device 102 for presentation to a user 104. Many other venue-sensitive operations may also be performed, accordingly.

Figure 2:
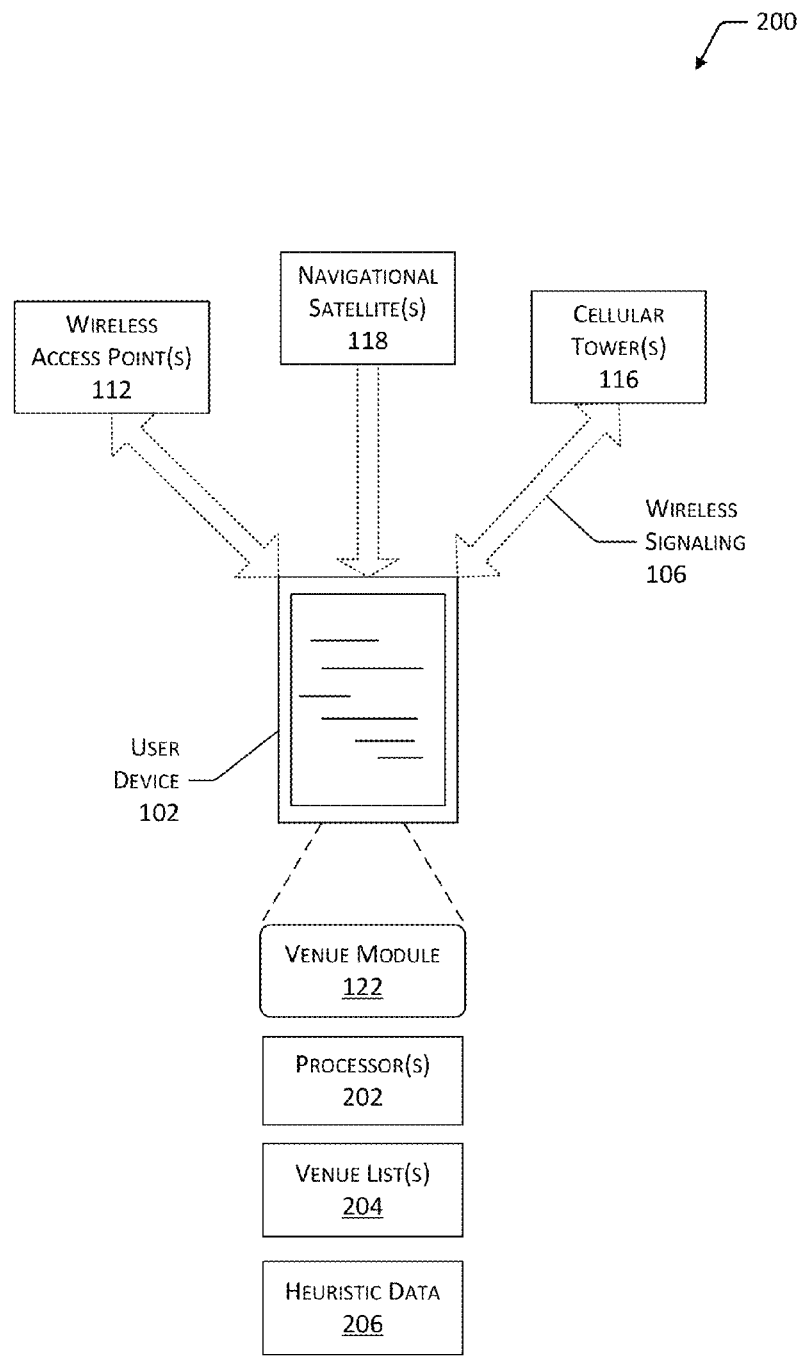
FIG. 2 illustrates a user device and illustrative resources thereof, and wireless resources that interact with the user device.

FIG. 2 depicts views 200 of the user device 102 and respective elements according to one implementation. The views 200 are illustrative and non-limiting in nature. Other implementations and variations may also be used.

The illustrative user device 102 includes the venue module 122 introduced above. The venue module 122 may include one or more processors, microcontrollers, or other devices configured to perform various operations in accordance with executable program code. The venue module 122 may also include executable program code stored within non-transitory, computer-readable storage media (CRSM). The venue module 122 may further include electronic circuitry, one or more application-specific integrated circuits (ASICs), or other suitable resources and constituency, and may be configured to communicate information or other signals with other aspects of the user device 102.

The user device 102 may also include one or more processors 202 configured to perform or control various operations of the user device 102 according to executable program code. One or more of the processors 202 may also be configured to communicate information, data, or other signals with the venue module 122.

The user device 102 may also include one or more venue lists 204. Each venue list 204 may include information regarding numerous venues 108, such as venue names, street addresses, business identifier codes, location coordinates (such as latitude, longitude, and altitude), previously determined wireless access point 112 identifiers, or other identifying information or data. Other information may also be included. The venue lists 204 may be stored in CRSM within the user device 102, and may be respectively acquired by way of requests issued to the server 120 or other support services, uploaded during a direct connection to an Internet-based resource, and so on.

The user device 102 may further include heuristic data 206. The heuristic data 206 may include data, information, previously identified wireless access points 112, previously verified identifier/venue associations, or other content. The heuristic data 206 may also include various mathematical or logical expressions, data matching or comparison procedures, or other heuristic techniques. The heuristic data 206 may be used by the venue module 122 during the association of respective identifiers with respective venues 108, during the calculation of confidence values or score values, and so forth. The heuristic data 206 may be expanded or amended over time by virtue of installments provided by the server 120 or another service, in accordance with machine learning techniques, as respective identifier/venue associations are verified or cataloged, or in other ways.

The illustrative user device 102 is also configured for bidirectional communication with one or more wireless access points 112, and with one or more cellular towers 116, by way of respective wireless signaling 106. The user device 102 is also configured to receive wireless signals from one or more respective navigational satellites 118. Thus, the user device 102 is equipped for respective wireless operations that may be used during venue 108 identification or other operations.

Figure 3:
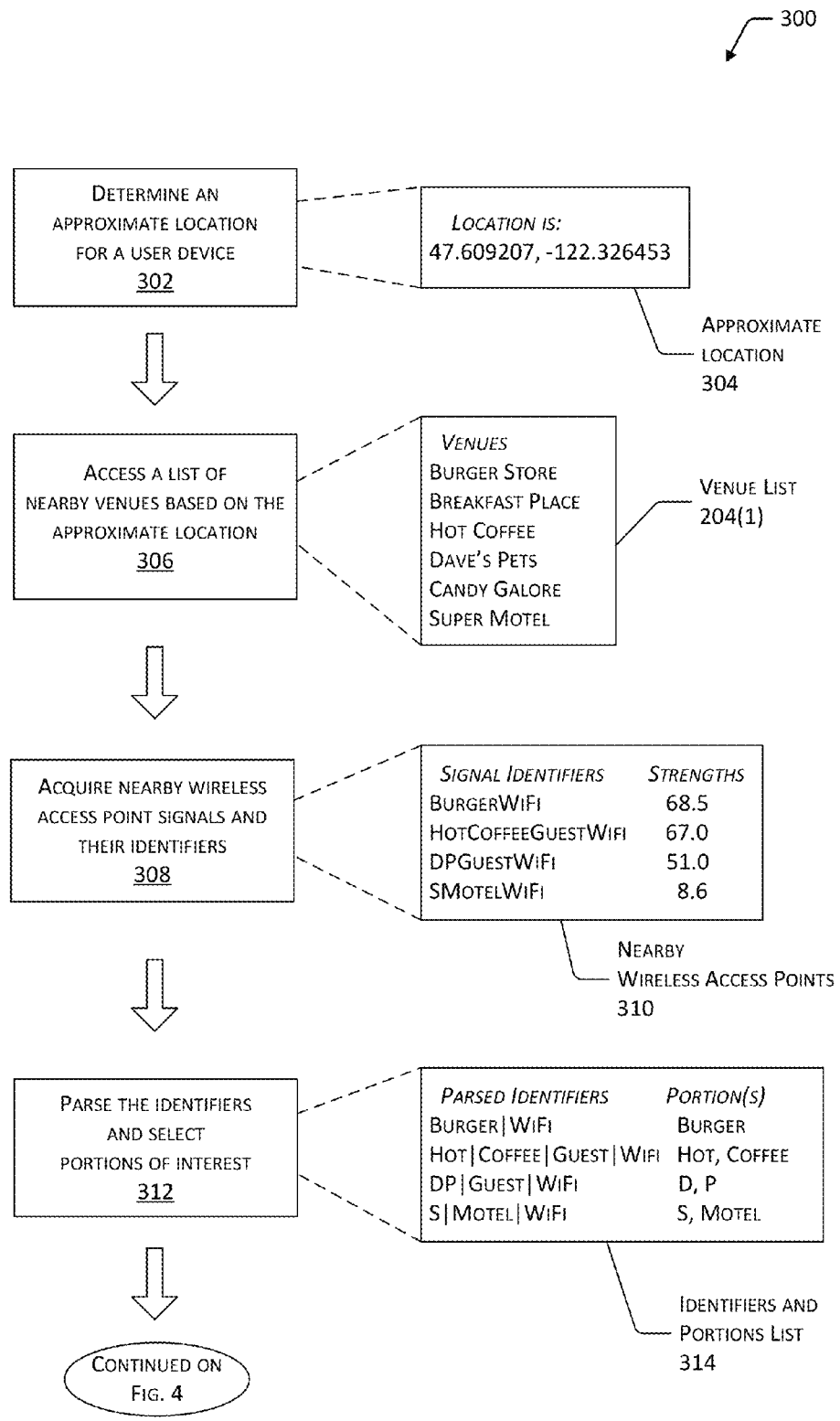
FIGS. 3 and 4 illustrate determination of a most likely venue for a user device.
Figure 4:
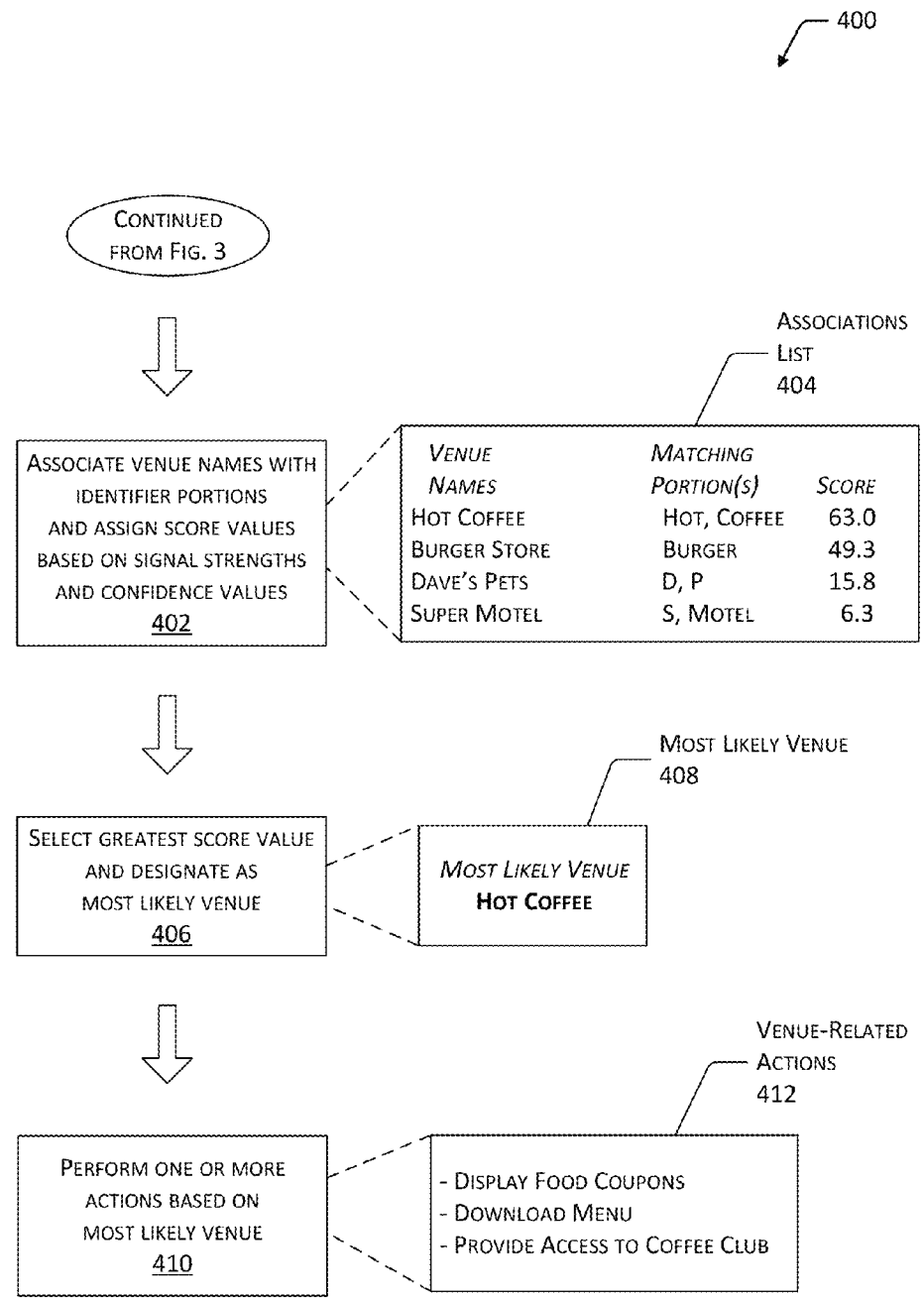

FIGS. 3 and 4 respectively depict views 300 and 400 that collectively include operations that may be performed toward the determination of a most likely venue. The particular operations and elements of the flow diagram 300 are illustrative and non-limiting in nature. Other implementations and variations may also be used.

Block 302 determines an approximate location 304 for a user device 102. For purposes of non-limiting illustration, the user device 102 receives wireless signals from numerous navigational satellites 118 and determines its geographic location to within some margin of error. For example, the determined location may be accurate to within a radius of 33 feet. For purposes of this illustration, the approximate location 304 is expressed in terms of latitudinal and longitudinal coordinates, such as 47.609207 degrees North, by 122.326453 degrees West—a location within Seattle, Wash., USA. The approximate location 304 may also be expressed in terms of a street address, a rural route number, an Internet protocol (IP) address for a known network access point, and so forth.

Block 306 accesses a stored list, or acquires a list, of nearby venues 108 based on the approximate location 304. In the present illustration, the user device 102 accesses a venue list 204 within CRSM and gathers information regarding respective venues 108 within a predetermined distance of the approximate location 304. As depicted, a total of six venues 108 are determined to be within, for instance, 150 feet of the approximate location 304. These respective venues 108 define or populate a venue list 204(1).

Block 308 acquires nearby wireless access point 112 signals and their respective identifiers. In the present illustration, the user device 102 detects four different wireless access points 112 by way of their respective wireless signals 106. An identifier and a signal strength value are determined for each of the four respective wireless access points 112. For example, a wireless access point 112 includes an identifier of "BurgerWiFi" and signal strength of 68.5 units, and so on for the other three detected wireless access points 112. The four respective identifiers and signal strength values collectively define nearby wireless access points 310.

These four respective wireless access points 112 have detected signal strengths above some predetermined threshold value, such as 2.0 units. Other signal strength selection or filtering criteria may also be used. At this point in the operation, it is assumed that the four nearby wireless access points 310 are associated with one or more of the venues 108 of the venue list 204(1).

Block 312 parses the identifiers and selects portions of interest. In the present illustration, the respective identifiers of the four nearby wireless access points 310 are parsed or otherwise processed by the venue module 122 in accordance with a predetermined heuristic method, such that portions of interest are identified or isolated. Each portion of interest is a character, recognizable word, or alphanumeric string that is evidentiary or descriptive in nature. For example, the identifier "BurgerWiFi" is parsed as respective portions "Burger" and "WiFi". The portion "Burger" is selected as a portion or element of interest. In turn, the identifier "HotCoffeeGuestWiFi" is parsed as respective portions "Hot", "Coffee", "Guest" and "WiFi". Therein, the portions "Hot" and "Coffee" are selected as portions or elements of interest.

Other portions or aspects of the four respective identifiers may be ignored or excluded as being generic or otherwise non-evidentiary with respect to associating that identifier with a particular venue 108. For example, portions such as "WiFi" and "Guest" may be ignored or filtered out as providing little or no information useful in making an identifier/venue association. The four parsed identifiers and their selected portions define an identifiers and portions list 314.

Block 402 associates venue names with identifier portions and assigns score values based on signal strengths and confidence values. In the present illustration, the venue module 122 of the user device 102 compares the selected portions from the identifiers and portions list 314 with portions or aspects of the names in the venue list 204(1), seeking word or string matches, or in accordance with other heuristic criteria. For example, the identifier portion "Burger" is a complete match for the word "Burger" in the venue name "Burger Store". In another example, the portions "Hot" and "Coffee" are complete matches for corresponding words in the venue name "Hot Coffee". Similar matches for initials such as "D" and "P" in the venue name "Dave's Pets" are also detected and noted. As a result, the four identifiers are respectively associated with four of the venues 108 from the venue list 204(1), as depicted by an associations list 404.

Each of the associations is assigned a confidence value based on the extent of the match or matches made between respective identifier portions and corresponding portions or aspects of the associated venue name. For example, a relatively high confidence value is assigned to the association made between the identifier "HotCoffeeGuestWiFi" and the venue name "Hot Coffee" because two of the selected identifier portions were complete, verbatim matches for words within that venue name. Contrastingly, the association made between "DPGuestWiFi" and "Dave's Pets" was assigned a lesser confidence value due to the single letter-only matches—"D" and "P"—there between.

Thereafter, a score value is assigned to each of the four respective associations based on the signal strengths and the confidence values. In this example, each score value is the arithmetical product of the corresponding signal strength and confidence values. Other score value methods or formulas may also be used. These four respective score values are depicted in the associations list 404.

Block 406 selects the greatest score value and designates it as the most likely venue 408. In the present illustration, the venue module 122 selects the greatest score, 63.0, as the most likely venue 408. This most likely venue 408 is the venue 108 where the user device 102 is most likely to be presently located or closest to. Thus, the user device 102 is assumed to be located within the venue 108 named "Hot Coffee", a retail coffee shop.

Block 410 performs one or more actions based on the most likely venue 408. In the present illustration, the user device 102 automatically connects to the wireless access point 112 identified as "HotCoffeeGuestWiFi", and issues a request for venue-related information. Such a request may be answered with various kinds of information, details on accessing available services, and so on. Illustrative and non-limiting examples of such venue-related actions 412 are as depicted. In one instance, one or more food coupons are presented on a display of the user device 102. In another instance, a menu of available beverages or food items is uploaded to the user device 102, and so forth.

The process depicted in views 300 and 400 is directed to matching characters, strings, or recognizable words that the respective identifiers and the venue names have in common. Other types of heuristic matching may also be used in either making the associations or assigning confidence values thereto, or both. In one approach, the greater the number of characters in a selected identifier portion that matches a portion within a venue name, the greater the resulting confidence value.

In yet another approach, the venue module 122 may access one or more previously established or verified identifier/venue associations while looking for complete matches within the detected wireless access point 112 identifiers. For instance, some large-scale commercial entities follow a single, specific identifier format throughout all of their geographic locations. Other sorts of previously determined information or patterning may also be used while matching or associating identifiers with respective venues.

Figure 5:
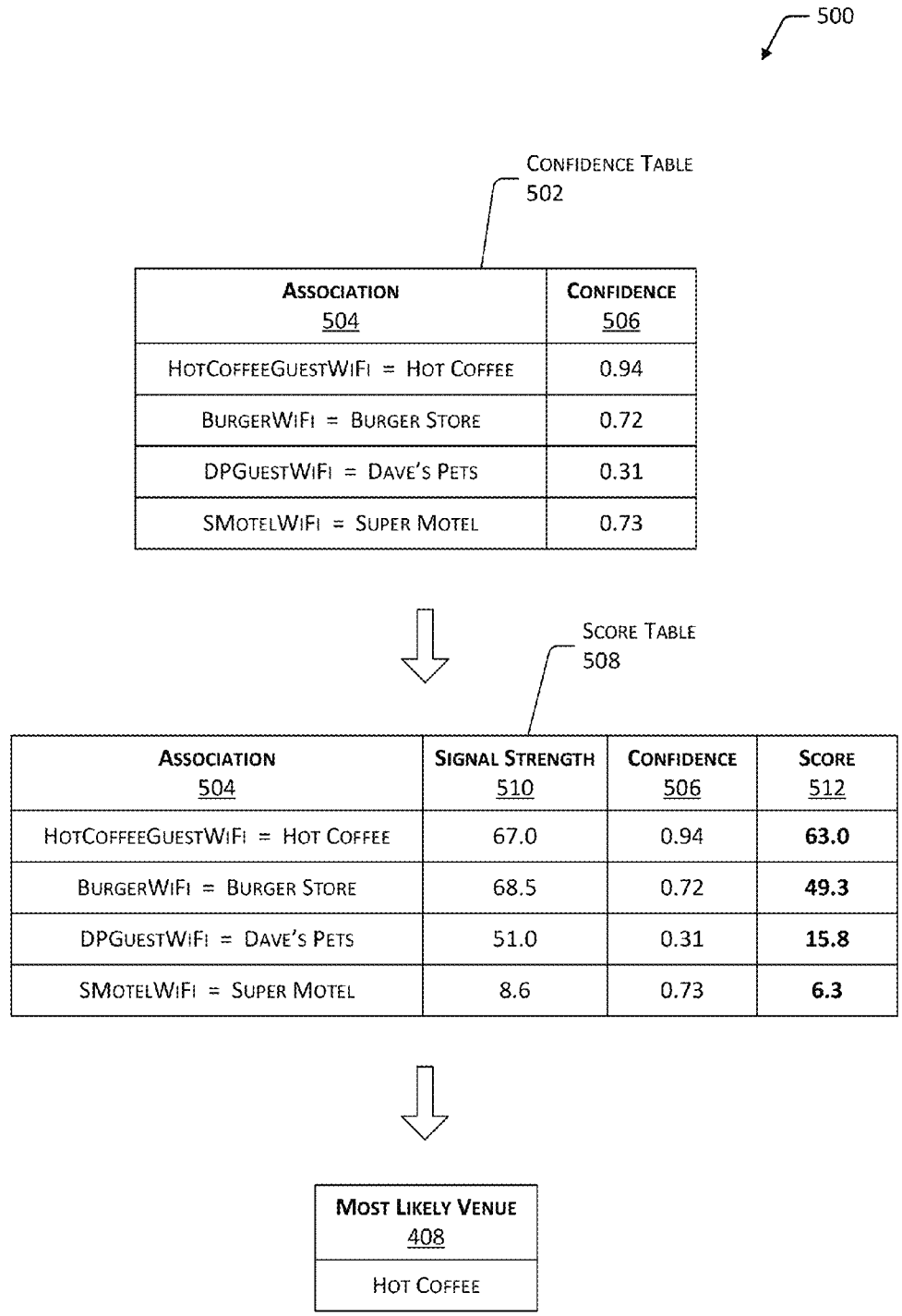
FIG. 5 illustrates respective tables of information and values related to associating respective identifiers with respective venues.

FIG. 5 depicts views 500 including respective tables of data and values used in determining a most likely venue 408. The particular data, their respective elements or values, or their respective arrangements, are illustrative and non-limiting in nature, and other data types or information may also be used or considered.

An illustrative confidence table 502 includes respective associations 504 made between wireless access point 112 identifiers and venue names. For example, the identifier "HotCoffeeGuestWiFi" is associated with the venue 108 "Hot Coffee", and so on. Confidence values 506 are also depicted, each corresponding to one of the associations. For example, the association 504 of "HotCoffeeGuestWiFi" with "Hot Coffee" has been assigned a confidence value of 0.94. Thus, the confidence table 502 includes four respective confidence values 506.

An illustrative score table 508 includes the respective associations 504, as well as corresponding wireless signal strength 510 value for each. For example, the wireless access point 112 having the identifier "HotCoffeeGuestWiFi" has a measured signal strength 510 of 67.0 units. The confidence value 506 of 0.94 corresponds to this same association. Score 512 values are also depicted for each of the associations 504.

Each score 512 is determined by multiplying the signal strength 510 by the confidence value 506 for the given association 504. For example, the association 504 including the venue name "Hot Coffee" is assigned a score 512 value of 63.0. As depicted, respective scores 512 of 63.0, 49.3, 15.8 and 6.3 are assigned to the four associations 504.

Further depicted is the most likely venue 408, which is selected as that venue 108 corresponding to the greatest score 512. As depicted, the venue 108 named "Hot Coffee" corresponds to the greatest score 512 of 63.0. Thus, "Hot Coffee" is selected as that venue 108 where the corresponding user device 102 is most likely located (or nearest to).

Figure 6:
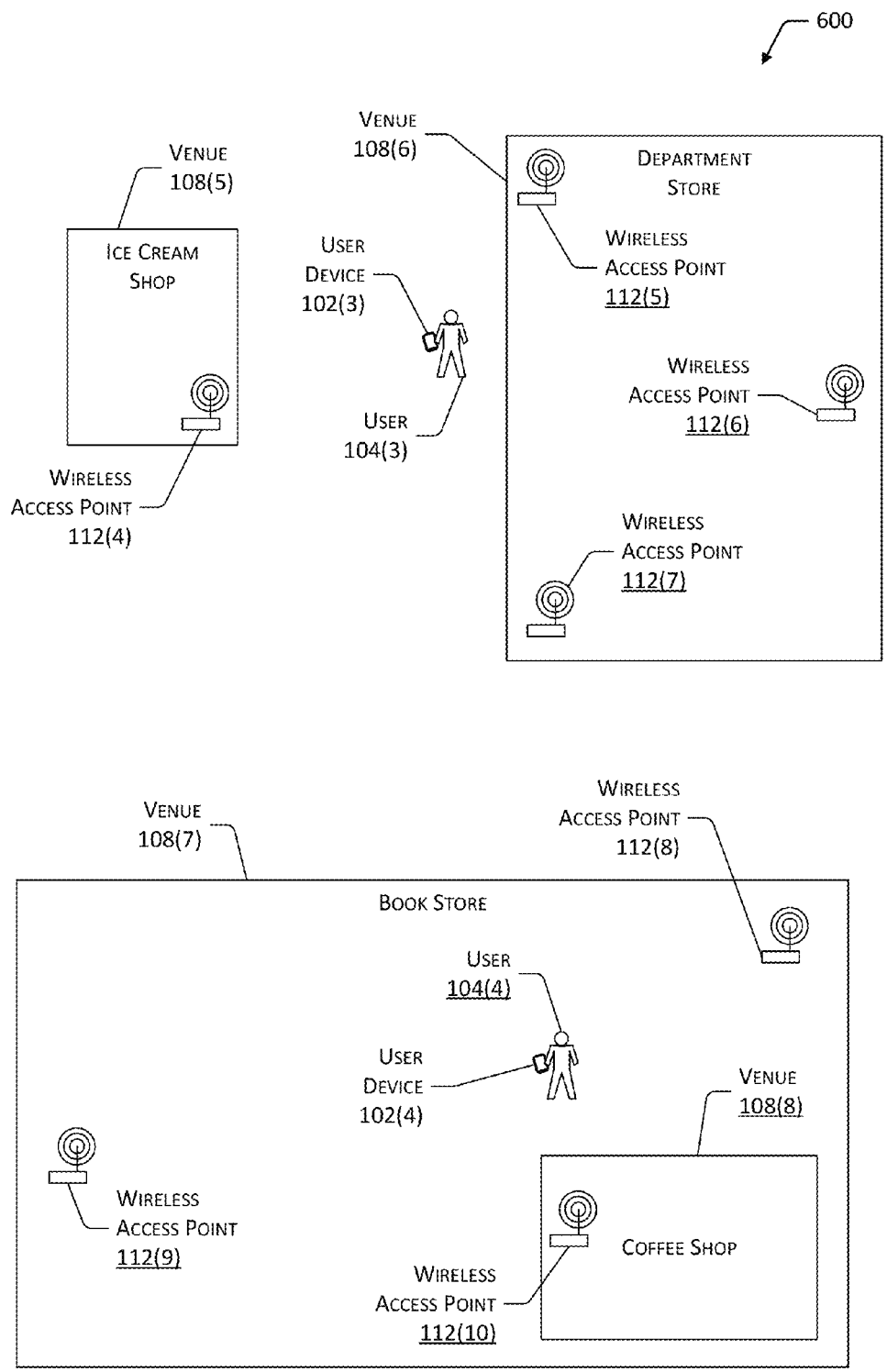
FIG. 6 is a block diagram depicting respective venues, wireless access points, and user devices.

FIG. 6 depicts views 600 including respective venues 108 and wireless access points 112, and operations involving these and other elements. The particular elements and operations of the views 600 are illustrative and non-limiting in nature. Other implementations and variations may also be used.

A venue 108(5) is depicted as an ice cream shop. The venue 108(5) includes or hosts a wireless access point 112(4) configured such that a user device 102 may communicate with one or more networks 114 or servers 120, and so forth. Also depicted is a venue 108(6) presented as a department store. Notably, the venue 108(6) occupies significantly greater area than that of the venue 108(5). The venue 108(6) includes three respective wireless access points 112(5), 112(6) and 112(7) distributed there within.

A user 104(3) is using a user device 102(3) and is located outside of, but proximate to, the venue 108(6). For purposes of illustration, it is assumed that the user device 102(3) is within detection range of the three wireless access points 112(5)-112(7) as hosted by the department store venue 108 (6). It is also assumed that the user device 102(3) is within detection range of the wireless access point 112(4) of the venue 108(5), having an identifier such as "IceCreamVisitorWiFi".

Additionally, it is assumed that the three respective identifiers of the wireless access points 112(5)-112(7) conform to a common format, such as "DeptStore1WiFi", "DeptStore2WiFi", and "DeptStore3WiFi". The venue module 122 of the user device 102(3) may be configured to recognize or conclude that each of these identifiers corresponds to the same venue 108(6). The venue module 122 may be further configured to use this conclusion when making the respective identifier/venue associations 504. For instance, a count of the number of detected wireless access points 112 apparently corresponding to the same venue 108 may be used in weighting or averaging the respective signal strengths 510 such that a single, collective association 504 is made. Other operations may also be performed in view of multiple wireless access points 112 corresponding to the same venue 108.

The venue module 122 of the user device 102(3) may then assign and consider respective confidence values 506 for two associations 504—rather than four—toward selecting either the venue 108(5) or 108(6) as the most likely venue 408 where the user device 102(3) is located or is most proximate to. Such an averaged or weighted association 504 and selection scheme may help to resolve ambiguities due to equidistance, disproportionate wireless access point 112 counts, and so forth.

A venue 108(7) is also depicted as a book store. The venue 108(7) includes two wireless access points 112(8) and 112(9). Also depicted is a venue 108(8) presented as a coffee shop located within the area of the venue 108(7). The venue 108(8) includes a wireless access point 112(10) there within. A user device 102(4) is associated with a user 104(4) and is located within the venue 108(7), somewhat proximate to the venue 108(8). For purposes of illustration, the user device 102(4) is within detection range of all three respective wireless access points 112(8), 112(9) and 112(10).

The depicted location of the user device 102(4) gives rise to a potential ambiguity as to selecting the venue 108(7) or the venue 108(8) as the most likely venue 408 where the user device 102(4) is located. The venue module 122 of the user device 102(4) may be configured to handle this sort of scenario by averaging the detected signal strengths 510, but such an approach may result in the false conclusion that the user device 102(4) is located within the coffee shop—that is, venue 108(8).

Alternatively, the venue module 122 may be configured to proceed by making three respective associations 504, identifying both the book store venue 108(7) and the coffee shop venue 108(8). Thereafter, heuristics may be applied so as to conclude that the coffee shop is located within the book store based on previously identified scenarios involving the respective operators of the venues 108(7) and 108(8). That is, these respective commercial entities are known to cooperate or associate in the depicted manner. The venue module 122 may then conclude that the user device 102(4) is located within the venue 108(7) but is not within the venue 108(8) based on comparing the signal strength 510 of the wireless access point 112(10) against a minimum threshold value. That is, the user device 102(4) is not considered to be within the venue 108(8) unless the corresponding signal strength 510 is greater than predetermined threshold value, as would a result from being in close proximity to the wireless access point 112(10). Other heuristic or selection making techniques may also be used.

Figure 7:
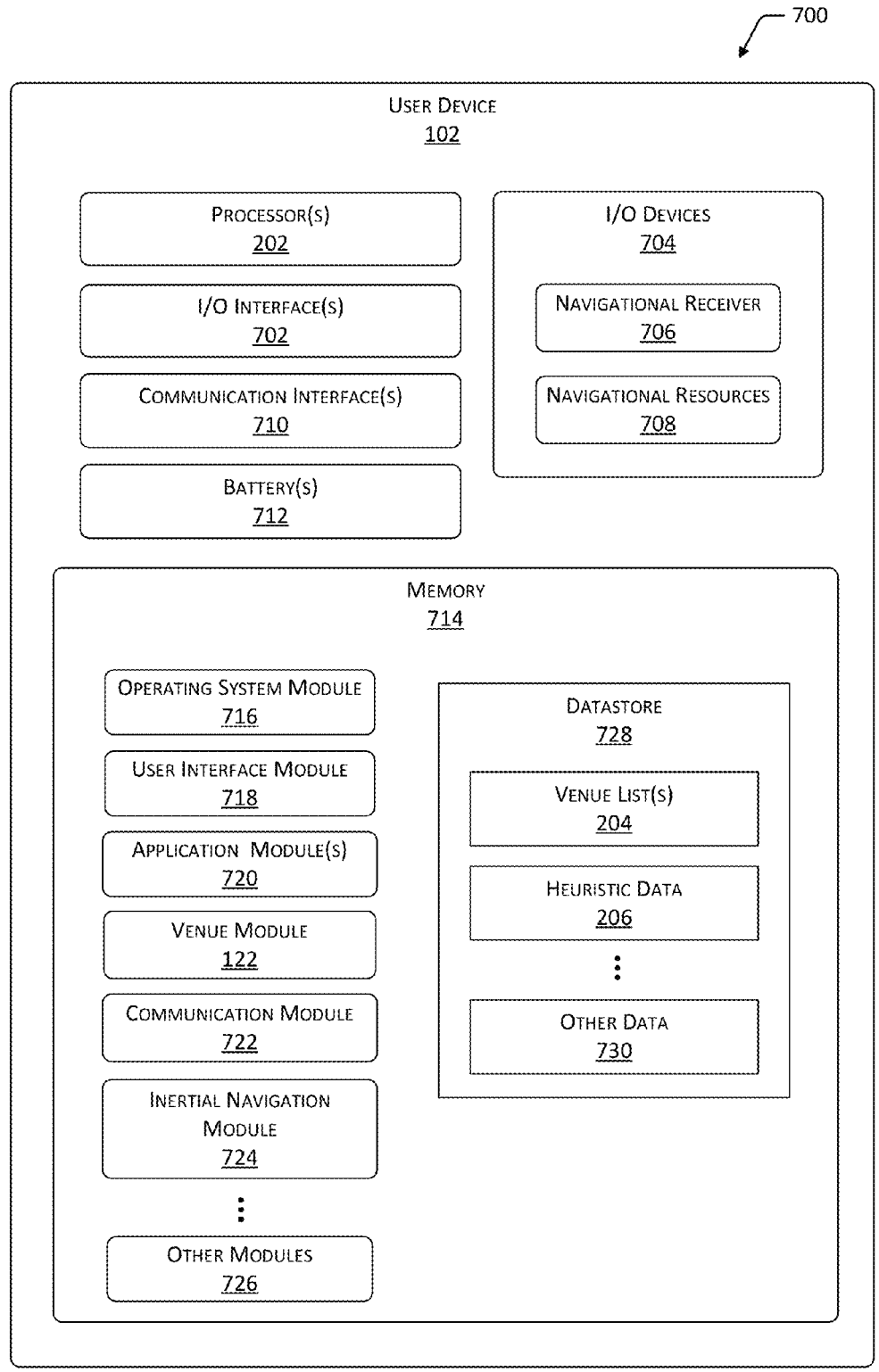
FIG. 7 is a block diagram depicting the user device.

FIG. 7 illustrates a block diagram 700 of a user device 102. The user device 102 is illustrative and non-limiting, and may be defined by a tablet computer, a wearable computer, an e-book reader, a media device, a cellular phone, or another suitable apparatus. The user device 102 may include one or more processors 202 configured to execute one or more stored instructions. The processor(s) 202 may comprise one or more cores.

The user device 102 may include one or more I/O interface(s) 702 to allow the processor(s) 202 or other portions of the user device 102 to communicate with various other user devices 102, other computing devices, the server 120, web-based resources, and so on. The I/O interfaces 702 may comprise I2C, SPI, USB, RS-232, and so forth.

The I/O interface(s) 702 may couple to one or more I/O devices 704. The I/O devices 704 may include one or more input devices such as a GNSS receiver 706, a keyboard, mouse, and so forth. The I/O devices 704 may include various navigational resources 708 such as one or more gyroscopes, a compass, a radio navigation receiver, or other elements or devices respectively configured for use in determining an approximate location for the user device 102. The I/O devices 704 may also include output devices such as one or more of a display, audio speakers, haptic output devices, and so forth. In some embodiments, the I/O devices 704 may be physically incorporated within the user device 102, or they may be externally placed.

The user device 102 may also include one or more communication interfaces 710. The communication interfaces 710 are configured to provide communications with other user devices 102, web-based resources, servers 120, routers, wireless access points 112, and so forth. The communication interfaces 710 may include wireless functions, devices configured to couple to one or more networks including PANs, LANs, WLANs, WANs, and so forth.

The user device 102 may also include one or more batteries 712 for providing electrical power during normal operations. The battery or batteries 712 may be rechargeable or disposable in nature. Other portable energy sources such as photovoltaic cells, and so forth, may also be used. The user device 102 may also include one or more busses or other internal communications hardware or software that allow for the transfer of data between the various modules and components of the user device 102.

The user device 102 includes one or more memories 714. The memory 714 comprises one or more computer-readable storage media (CRSM). The memory 714 provides storage of computer readable instructions, data structures, program modules and other data for the operation of the user device 102. The memory 714 may include at least one operating system (OS) module 716. Respective OS modules 716 are configured to manage hardware devices such as the I/O interfaces 702, the I/O devices 704, the communication interfaces 710, and provide various services to applications or modules executing on the processors 202.

Also stored in the memory 714 may be one or more of the following modules. These modules may be executed as foreground applications, background tasks, and so forth. A user interface module 718 may be configured to provide one or more application programming interfaces. The user interface module 718 may be configured to operate with information encoded as hypertext markup language ("HTML") files, extensible markup language ("XML") files, or in another suitable format or language. The user interface module 718 is configured to accept inputs and send outputs using the I/O interfaces 702, the communication interfaces 710, or both.

The memory 714 may also store one or more of the application modules 720. Non-limiting examples of the applications modules 720 include a word processing application, a spreadsheet application, a technical drawing or illustrating application, a web browsing application, a portable document viewing application, and so on. The memory 714 may also include the venue module 122 as described above. The memory 714 may further store a communication module 722 such that wireless signaling 106 may be communicated to and from the user device 102.

The memory 714 may also store an inertial navigation module 724 configured to provide location data or information based upon measured displacements of the user device 102 relative to a known point of origin. The inertial navigation module 724 may include one or more accelerometers, electronic circuitry, a dedicated processor, executable program code, or other constituency.

The inertial navigation module 724 may be further configured to reestablish a new point of origin from time-to-time in the interest of avoiding excessive cumulative error, when such a new origin is verifiable by user input or by automatic techniques. For example, coupling the user device to a home-based network may trigger the inertial navigation module 724 to automatically establish a home address as a new point of origin. The memory 714 may also include one or more other modules 726. Non-limiting examples of the other modules 726 may include cellular communications circuitry, a watchdog or other timer, a radio receiver, ports or resources for wired communications, and so forth.

The memory 714 may also include a datastore 728 to store information. The datastore 728 may use a flat file, database, linked list, tree, executable code, or other data structure to store the information. In some implementations, the datastore 728 or a portion of the datastore 728 may be distributed across one or more other user devices 102 or computing devices including servers 120, network attached storage apparatus, and so forth.

The datastore 728 may store one or more venue lists 204 as described above. Thus, respective venue lists 204 may correspond to various locations, and so forth. The datastore 728 may also store heuristic data 206 as described above. Such heuristic data 206 may include data, information, previously verified identifier/venue associations 504, or other content. The heuristic data 206 may also include mathematical or logical expressions, data comparison procedures, or other techniques accessed or used by the venue module 122. The datastore 728 may also store other data 730. For example, the other data 730 may include one or more data structures that may be queried, modified, amended, and so forth.

Figure 8:
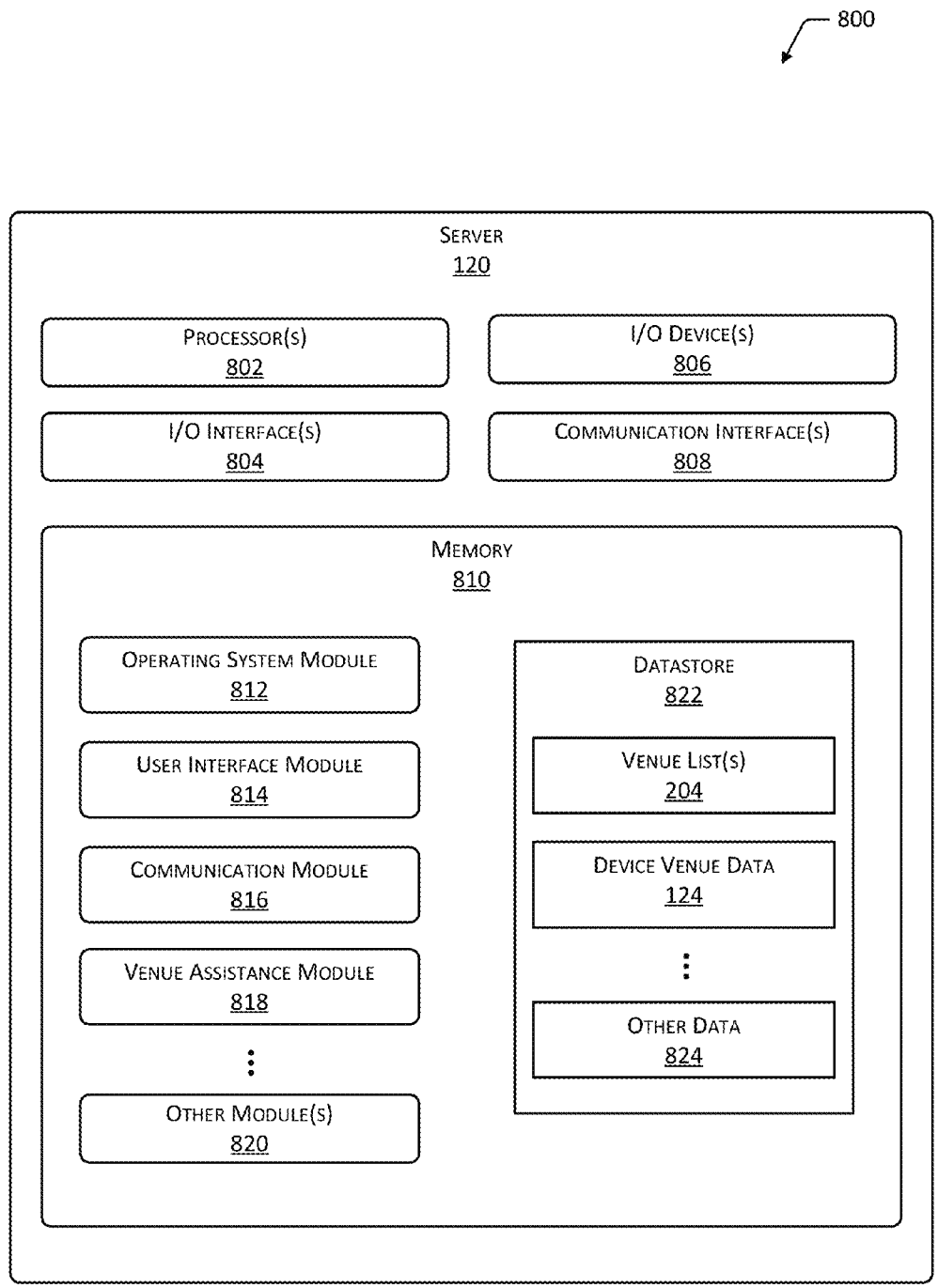
FIG. 8 is a block diagram depicting a server.

FIG. 8 illustrates a block diagram 800 of the server 120. The server 120 is illustrative and non-limiting, and other servers or computing devices of analogous or respectively varying configuration or constituency may also be used. The server 120 may include one or more processor(s) 802 configured to execute one or more stored instructions. The processor(s) 802 may comprise one or more cores.

The server 120 may include one or more I/O interface(s) 804 to allow the processor(s) 802 or other portions of the server 120 to communicate with the user devices 102, with other servers 120 or computing devices, and so on. The I/O interface(s) 804 may comprise I2C, SPI, USB, RS-232, and so forth.

The I/O interface(s) 804 may couple to one or more I/O devices 806. The I/O devices 806 may include one or more input devices such as a keyboard, mouse, and so forth. The I/O devices 806 may also include output devices such as one or more of a display, audio speakers, haptic output devices, and so forth. In some embodiments, the I/O devices 806 may be physically incorporated with the server 120, or they may be externally placed.

The server 120 may also include one or more communication interface(s) 808. The communication interfaces 808 are configured to provide communications between the server 120 and the user devices 102, other servers or network-based services, routers, wireless access points 112, and so forth. The communication interfaces 808 may include wireless functions, devices configured to couple to one or more networks 114 including PANs, LANs, WLANs, WANs, and so forth. The server 120 may also include one or more busses or other internal communications hardware or software that allow for the transfer of data between the various modules and components of the server 120.

The server 120 includes one or more memories 810. The memory 810 comprises one or more CRSM. The memory 810 provides storage of computer readable instructions, data structures, program modules and other data for the operation of the server 120. The memory 810 may include at least one operating system module 812. Respective OS modules 812 are configured to manage hardware devices such as the I/O interfaces 804, the I/O devices 806, the communication interfaces 808, and provide various services to applications or modules executing on the processors 802.

Also stored in the memory 810 may be one or more of the following modules. These modules may be executed as foreground applications, background tasks, and so forth. A user interface module 814 may be configured to provide one or more application programming interfaces. The user interface module 814 may also generate or provide one or more user input devices or user selection devices to a user device 102. Such user interfaces may be encoded as hypertext markup language ("HTML") files, extensible markup language ("XML") files, or in another suitable format or language. The user interface module 814 is configured to accept inputs and send outputs using the I/O interfaces 804, the communication interfaces 808, or both.

A communication module 816 is configured to support communication with various user devices 102, one or more other servers 120, computing devices or apparatus, and so forth using the one or more networks 114. In some implementations, the communication module 816 may support encrypted communications. For example, hypertext transport protocol secured ("HTTPS") or transport layer security ("TLS") may be supported.

The memory 810 may also include a venue assistance module 818. The venue assistance module 818 may be configured and resourced so as to perform one or more operations toward determining a most likely venue 408 in response to a user device 102 request. The venue assistance module 818 may also respond to requests for nearby venue lists 204, construct such venue lists 204 in accordance with requests received from respective user devices 102, and so forth. The venue assistance module 818 may perform other actions or services, as well.

The memory 810 may also include one or more other modules 820. For example, a service support module may request or access particular resources on behalf of a user device 102. Such a module 820 may seek to acquire or update venue-related information on an ongoing basis. Other modules or functionalities may also be implemented.

The memory 810 may also include a datastore 822 to store information. The datastore 822 may use a flat file, database, linked list, tree, executable code, or other data structure to store the information. In some implementations, the datastore 822 or a portion of the datastore 822 may be distributed across one or more other devices including servers, network attached storage devices, and so forth.

The datastore 822 may store one or more venue lists 204. Such venue lists 204 may be provided in response to requests by respective client devices 102, may be accessed by the venue assistance module 818, or applied to other purposes. The datastore 822 may also store device venue data 124 indicative of various venues 108 where respective user devices 102 are presently located. The datastore 822 may also store other data 824. For example, the other data 824 may include textual, graphic, or audio data to be provided to a requesting user device 102, one or more scripts to automate respective functions, and so on. The other data 824 may also include one or more data structures that may be queried, modified, amended, and so forth.

Figure 9:
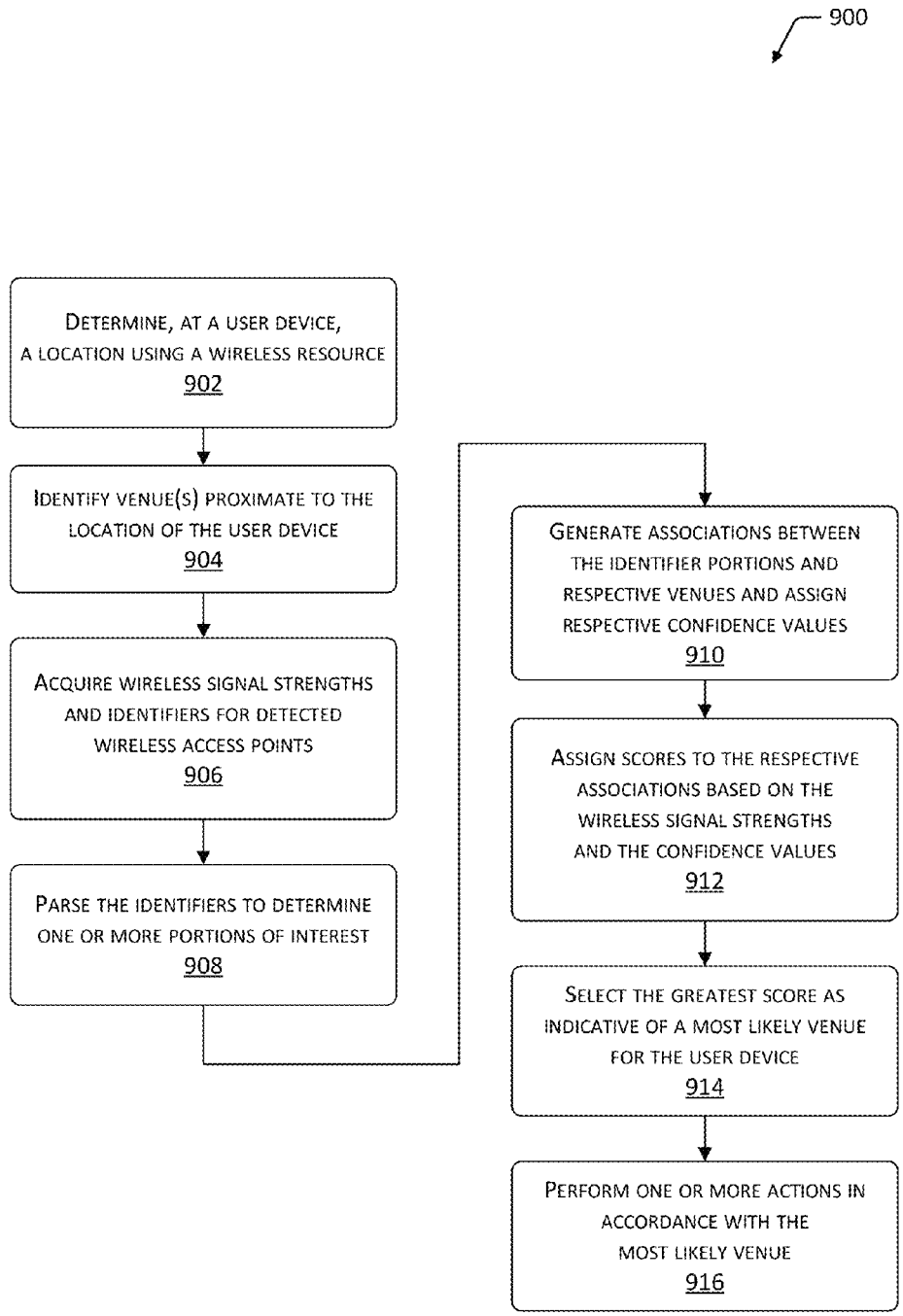
FIG. 9 is a flow diagram of an illustrative process of determining a most likely venue for the user device.

FIG. 9 is a flow diagram 900 illustrating a process including determining a most likely venue 408 for a user device 102. The process of the flow diagram 900 is illustrative and non-limiting, and other processes including one or more other steps, omitting one or more of the depicted steps, or proceeding in other orders of execution, may also be used.

Block 902 determines, at a user device 102, a location using a wireless resource. For purposes of a present example, a user device 102 receives wireless signals 106 from one or more cellular towers 116. Through a process of triangulation, a venue module 122 of the user device 102 determines an approximate location for the user device 102 as a street address, such as 123 Main Street, City, State, USA. In an alternative operation, a server 120 or other resource of a cellular communications service determines an approximate location for the user device 102 based on signal correspondences with two or more cellular towers 116. The server 120 or other service then communicates the approximate location to the user device 102. Other similar or varying techniques may also be used.

Block 904 identifies one or more venues 108 proximate to the location of the user device 102. In the present example, the venue module 122 accesses one or more venue lists 204 stored within the user device 102 and identifies numerous venues 108 within a predetermined distance of the present location. For instance, the venue module 122 may identify six respective venues 108 within 150 feet of the location, collectively defining a venue list 204(1).

Block 906 acquires wireless signal strengths 510 and identifiers for detected wireless access points 112. In the present example, the venue module 122 acquires or surveys wireless signaling 106 provided by detectable wireless access points 112 thereabout. Specifically, the user device 102 measures a signal strength 510 and determines an identifier for each of the detected wireless access points 112 whose signals exceed a predetermine threshold value. For purposes of illustration, a listing of nearby wireless access points 310 is generated, including signal strengths 510 and identifiers for four distinct wireless access points 112.

Block 908 parses the identifiers to determine one or more portions of interest. In the present example, the venue module 122 processes the four respective identifiers from the nearby wireless access points 310, applying heuristics, word recognition, or other techniques so as to select characters, text strings, or other portions of interest. Additionally, respective portions of the identifiers deemed to be of little or no identification value are ignored. For example, an identifier "SMotelWiFi" was acquired during the operation of Block 906, wherein the parsing and determination yields "S" and "Motel" as portions of interest, and wherein the portion "WiFi" is deemed generic and not useful for further identification purposes. In this illustration, the parsing and determination process yields the identifiers and portions list 314.

Block 910 generates associations 504 between the identifier portions and respective venues 108 and assigns respective confidence values 506. In the present example, the venue module 122 compares the selected portions from the identifiers and portions list 314 with the respective venue names, seeking partial or whole word matches, matching initials or abbreviations, or using other heuristics to identify various similarities.

For instance, the selected portion "Motel" is a word match within the venue name "Super Motel", and so on. Respective associations 504 are made between the identifiers and the venues 108 by way of the comparisons or heuristics. The venue module 122 also uses the extent of these respective matches, or other heuristic techniques, to calculate and assign a confidence value 506 or metric to each of the associations 504. In this illustration, the confidence table 506 is the result of these respective operations.

Block 912 assigns scores 512 to the respective associations 504 based on the wireless signal strengths 510 and the confidence values 506. In the present example, the venue module 122 assigns a score 512 to each association 504 by multiplying the corresponding signal strength 510 by the corresponding confidence value 506. For instance, in the case of the association 504 between "SMotelWiFi" and "Super Motel", the corresponding score 512 is calculated as: (8.6)×(0.73)= 6.3. The resulting scores 512 and other data are used to populate the score table 508.

Block 914 selects the greatest score 512 as indicative of a most likely venue 408 for the user device 102. In the present example, the venue module 122 selects the greatest score, 63.0, as indicative of the most likely venue 408 that the user device 102 is presently located. In the present illustration, the venue 108 named "Hot Coffee", a beverage and food service retailer, is designated as the most likely venue 408.

Block 916 performs one or more actions in accordance with the most likely venue 408. In the present example, the user device 102 uses the just-designated most likely venue 408, "Hot Coffee", to perform or trigger one or more actions. For instance, a menu or beverages or food items may be requested by way of a corresponding wireless access point 112 and uploaded to the user device 102, the user device 102 may display one or more previously uploaded coupons, and so on. Other actions may also be performed.

Figure 10:
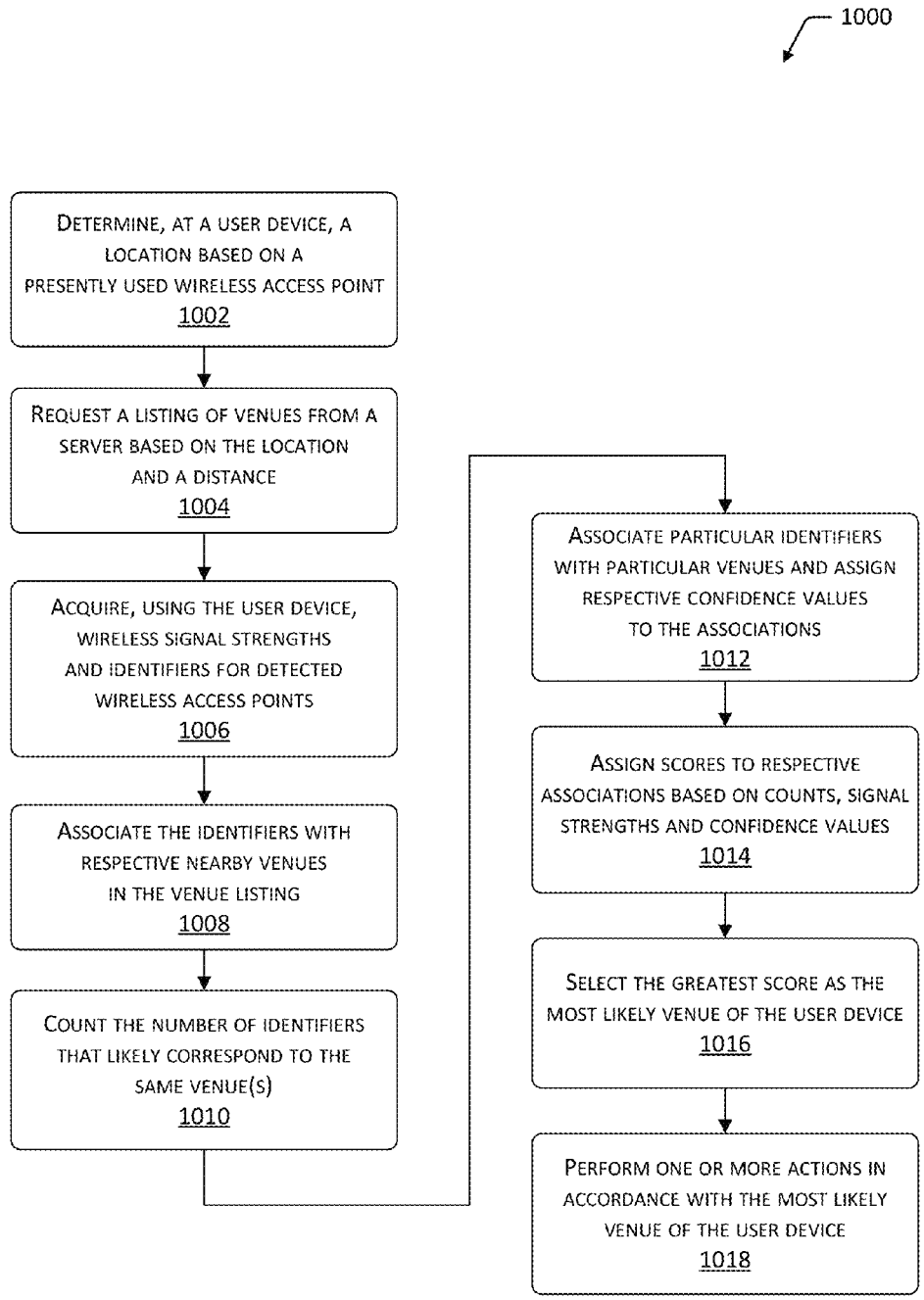
FIG. 10 is a flow diagram of another illustrative process of determining a most likely venue for the user device.

FIG. 10 is a flow diagram 1000 illustrating a process including determining a most likely venue 408 for a user device 102. The process of the flow diagram 1000 is illustrative and non-limiting, and other processes including one or more other steps, omitting one or more of the depicted steps, or proceeding in other orders of execution, may also be used.

Block 1002 determines, at a user device 102, a location based on a presently used wireless access point 112. For purposes of a present example, a user device 102 is communicating with a particular wireless access point 112(8), which provides its IP address as "111.22.333.4". A venue module 122 of the user device 102 then communicates with one or more Internet based resources to acquire location for the presently used IP address. Such a location may be given, for example, as global coordinates or a street address, and so on.

Block 1004 requests a listing of venues 108 from a server 120 based on the location and a predetermined distance or range. In the present example, the user device 102 issues a request for nearby venues 108 to a server 120, the request including the location acquired at block 1002 and a predetermined distance or radius of interest. For instance, 200 feet about the location. The request is communicated by wireless signaling 106 from the user device 102 to the presently used wireless access point 112(8), which then sends the request on to the server 120 by way of one or more networks 114.

The server 120 responds to the request by accessing one or more venue lists 204 stored therein, selecting numerous venues 108 in accordance with the location and predetermined distance criteria. The server 120 then communicates these venues 108—that is, names, locations, or other information related thereto—back to the user device 102 by way of wireless signaling 106 and the presently used wireless access point 112. In the present illustration, the server 120 communicates that a book store venue 108(7) and a coffee shop venue 108(8) match the requested criteria.

Block 1006 acquires wireless signal strengths 510 and identifiers for detected wireless access points 112. In the present example, the venue module 122 acquires or surveys wireless signaling 106 provided by three detectable wireless access points 112(8), 112(9) and 112(10). Specifically, the user device 102 measures a signal strength 510 and determines an identifier for each of the detected wireless access points 112(8)-112(10).

Block 1008 associates the identifiers with respective nearby venues 108. In the present example, the venue module 122 processes the respective identifiers from the wireless access points 112(8)-112(10), applying word recognition, string matching, heuristics or other techniques so as to select characters, text strings, or other portions of interest. Additionally, portions of the identifiers deemed to be of little or no identification value are ignored.

Block 1010 counts the number of identifiers that likely correspond to the same venue or venues 108. In the present example, the venue module 122 notes that the wireless access points 112(8) and 112(9) have respective identifiers as "BookGuest1WiFi" and "BookGuest2WiFi". The venue module 122 heuristically concludes that these respective identifiers, by virtue of their single-character distinctions "1" and "2", correspond to the same venue.

Block 1012 associates particular identifiers with particular venues 108 and assigns respective confidence values 506 to the associations 504. In the present example, the venue module 122 compares selected portions of respective venue names, seeking partial or whole word matches, matching abbreviations, or using other heuristics to identify various similarities. The venue module 122 thereby determines that the wireless access points 112(8) and 112(9) both correspond to a venue 108(7) named "Book Store", and that the wireless access points 112(10) corresponds to a venue 108(8) named "Coffee Shop".

Further in the present illustration, the venue module 122 also determines, using previously determined associations or business information, that "Book Store" and "Coffee Shop" are cooperative commercial entities, wherein "Coffee Shop" is likely located within "Book Store". The venue module 122 also assigns confidence values 506 to each of the associations 504 based on the extent of the respective identifier portion/venue name matches.

Block 1014 assign scores 512 to respective associations 504 based on counts, signal strengths 510 and confidence values 506. In the present example, the venue module 122 assigns weighted scores to associations 504 corresponding to the wireless access points 112(8) and 112(9) in accordance with the assumption that these correspond to the same venue 108(7), "Book Store". A respective score 512 is also assigned to the association 504 between the wireless access point 112(10) and the venue 108(8), "Coffee Shop".

The venue module 122 further weights or adjusts the respective scores 512 in accordance with the conclusion that "Coffee Shop" is located within "Book Store". Specifically, the venue module 122 adjusts or reduces the score 512 corresponding to the venue 108(8), because a greater signal strength 510 than that measured at block 1006 would be expected if the user device 102 were actually located within the "Coffee Shop".

Block 1016 selects the greatest score 512 as the most likely venue 408 of the user device 102. In the present example, the venue module 122 selects the score 512 assigned to the association 504 including the identifier for the wireless access point 112(8), one of two such wireless access points 112 associated with the venue 108(7) "Book Store". Thus, the venue 108(7) "Book Store" is selected as the most likely venue 408 where the user device 102 is presently located.

Block 1018 performs one or more actions in accordance with the most likely venue 408 of the user device 102. In the present example, the user device 102 uses the just-designated most likely venue 408, "Book Store", to perform or trigger one or more actions. For instance, a floor plan describing the locations of various books or other materials, based on author or subject, may be uploaded to the user device 102. In another instance, the user device 102 may request sales or present promotional offerings from a server 120 associated with "Book Store". Other actions may also be performed.

Figure 11:
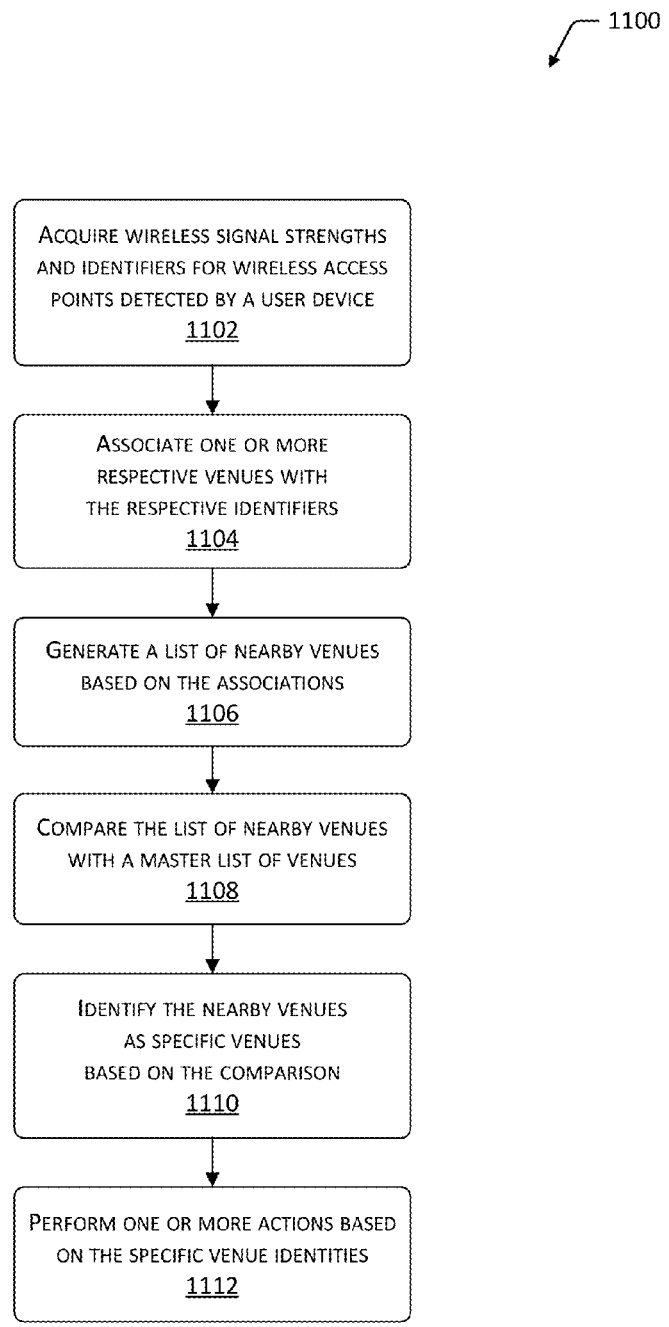
FIG. 11 is a flow diagram of another illustrative process of identifying nearby venues by surveying wireless access points using the user device.

FIG. 11 is a flow diagram 1100 depicting process including identifying venues 108 near a user device 102. The process of the flow diagram 1100 is illustrative and non-limiting, and other processes including one or more other steps, omitting one or more of the depicted steps, or proceeding in other orders of execution, may also be used.

Block 1102 acquires wireless signal strengths 510 and identifiers for wireless access points 112 detected by a user device 102. In one example, a user device 102(1) acquires signal strengths 510 and identifiers for wireless access points 112(1), 112(2), and 112(3), which are within detectable range of the user device 102(1). As such, the user device 102(1) performs a survey of the detectable RF space so as determine what wireless access points 112 are thereabout, and does so without use or determination of a present location.

Block 1104 associates one or more respective venues 108 with the respective identifiers. In the present example, the venue module 122 uses partial or whole word matches, abbreviation-to-word correspondences, or other heuristics to identify various similarities between the detected identifiers and known venue names. For instance, the venue module 122 may compare the just-acquired identifiers with a stored list of previously recognized identifiers, or with a list of identifiers provide by a server 120. The venue module 122 thereby associates the wireless access points 112(1), 112(2), and 112(3) with a "computer store", a "coffee shop", and a "bank", respectively. Thus, three particular associations 504 are made.

Block 1106 generates a list of nearby venues 108 based on the associations 504. In the present example, the venue module 122 aggregates the three associations 504 made at 1104 above as a list of nearby venues 108, such that the respective nearby venues 108 may be considered collectively.

Block 1108 compares the list of nearby venues 108 with a master list of venues 108. In the present example, the venue module 122 compares the list of proximate venues 108 with a master list or aggregation of respective venues 108. Such a master list may include respective venue names, geographical coordinates, street addresses, business identifiers, or other information for numerous venues 108 within a (potentially) vast geographical area, such as all of North America, or all of Western Europe, and so on. Master lists corresponding to areas of other relative sizes may also be used.

Specifically, the venue module 122 searches the master list in an attempt to locate three venues 108—a "computer store", a "coffee shop", and a "bank"—that are proximate to each other. The venue module 122 may also search the master list for one or more distributions or arrangements of such venues 108, based on the signal strengths 510 of the wireless access points 112(1), 112(2), and 112(3).

Block 1110 identifies the nearby venues 108 as specific venues 108 based on the comparison. In the present example, the venue module 122 has found three specific venues 108(1), 108(2), and 108(3) within the master list that are proximate to each other and consistent with the "computer store", "coffee shop", and "bank" of the present associations 504. The venue module 122 associates the particular venue names, street addresses, and other information provided by the master list with the nearby venues 108. Thus, the nearby venues 108 are now specifically identified as the venues 108(1), 108(2), and 108(3), respectively.

Block 1112 performs one or more actions based on the specific venue identities. In the present example, the user device 102(1) may display sales offerings for the "computer Store" venue 108(1), upload a menu of beverages or food items related to the "coffee shop" venue 108(2), and so forth. Other actions corresponding to the specifically identified venues 108(1)-108(3) may also be performed.

The method just described above is directed to identifying venues 108 proximate to a user device 102 without using a location as a starting point. From one perspective, the identifiers of detected wireless access points 112 define a group or "constellation" of venues 108 about the user device 102. Thereafter, a master listing of venues 108 is searched in an attempt to identify a similar or matching group, wherein the respective venues 108 are proximate to each other in some geographical place. Such a search may yield more than one candidate group, wherein other heuristic or contextual information, such as a last known location, may be used to select one of the groups in making the venue identifications.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium and so forth. For example, the computer readable storage media may include, but is not limited to, hard drives, floppy diskettes, optical disks, read-only memories (ROMs), random access memories (RAMs), EPROMs, EEPROMs, flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. An apparatus comprising:
a wireless communication interface;
a memory, storing computer-executable instructions; and
a processor to execute the computer-executable instructions to:
obtain a location for the apparatus;
obtain a listing of one or more venue names for one or more venues within a distance of the location;
receive a first signal from a first wireless access point and determine a first service set identifier (SSID) of the first wireless access point and a first signal strength of the first signal;
receive a second signal from a second wireless access point and determine a second SSID of the second wireless access point and a second signal strength of the second signal;
compare the first SSID with a first venue name of the one or more venue names and determine a first confidence value corresponding to a match between at least a portion of the first SSID and at least a portion of the first venue name;
compare the second SSID with a second venue name of the one or more venue names and determine a second confidence value corresponding to a match between at least a portion of the second SSID and at least a portion of the second venue name; and
select a venue as a most likely venue that the apparatus is located at based at least in part on the first confidence value, the second confidence value, the first signal strength, and the second signal strength.

2. The apparatus of claim 1, wherein the processor is further configured to execute the computer-executable instructions to:
send a request for the listing of the one or more venue names to a server, the request including the location; and
receive the listing of the one or more venue names from the server.

3. The apparatus of claim 1, wherein the processor is further configured to execute the computer-executable instructions to:
receive the first venue name by way of a request sent to one or more of the first wireless access point or the second wireless access point; and
determine the first confidence value using the first SSID.

4. The apparatus of claim 1, wherein the processor is further configured to execute the computer-executable instructions to:
perform one or more actions corresponding to the most likely venue, the one or more actions including one or more of:
presenting information regarding the most likely venue, or
accepting user input related to a service or product provided by the most likely venue.

5. A method comprising:
obtaining a first signal strength of a first signal from a first wireless access point and a first identifier of the first wireless access point;
obtaining a second signal strength of a second signal from a second wireless access point and a second identifier of the second wireless access point;
comparing the first identifier and the second identifier with one or more venue names; and
selecting a venue based at least in part on a result of the comparing and the first signal strength and the second signal strength.

6. The method of claim 5, wherein the comparing includes at least one of string matching, pattern matching, heuristic matching, or matching a previously determined identifier with at least the first identifier or the second identifier.

7. The method of claim 5, wherein the selected venue corresponds to a most likely venue where a user device is located.

8. The method of claim 5, wherein the result of the comparing comprises a confidence value.

9. The method of claim 5, further comprising:
determining a location of a user device; and
obtaining the one or more venue names using the location of the device.

10. The method of claim 9, further comprising:
communicating a request for information to a server, the request including the location of the user device; and
receiving information regarding the one or more venue names from the server.

11. The method of claim 9, further comprising:
accessing a venue list stored within the user device; and
selecting the one or more venue names from the venue list based at least in part on the location of the user device.

12. The method of claim 5, wherein comparing the first identifier and the second identifier with the one or more venue names includes:
parsing the first identifier into a first plurality of elements, wherein individual elements include one or more characters;
comparing the first plurality of elements with the one or more venue names;
parsing the second identifier into a second plurality of elements, wherein individual elements include one or more characters; and
comparing the second plurality of elements with the one or more venue names.

13. The method of claim 5, further comprising:
computing a first score corresponding to a likelihood that a user device is located at a first venue; and
wherein selecting the venue is based at least in part on the first score.

14. The method of claim 5, wherein selecting the venue includes comparing the first signal strength and the second signal strength to a threshold.

15. One or more computing devices, collectively configured to:
obtain one or more venue names proximate to a location;
obtain a first signal strength of a first signal from a first wireless access point and a first identifier of the first wireless access point;
obtain a second signal strength of a second signal from a second wireless access point and a second identifier of the second wireless access point;
compare the first identifier and the second identifier with the one or more venue names; and
select a venue based at least in part on a result of the comparing and the first signal strength and the second signal strength.

16. The one or more computing devices of claim 15, further configured such that the result of the comparing comprises a confidence value.

17. The one or more computing devices of claim 15, further configured to provide information corresponding to the selected venue to a user device.

18. The one or more computing devices of claim 15, wherein the comparing the first identifier and the second identifier with the one or more venue names includes at least one of string matching, pattern matching, heuristic matching, or matching a previously determined identifier with at least the first identifier or the second identifier.

19. The one or more computing devices of claim 15, wherein the comparing the first identifier and the second identifier with the one or more venue names comprises identifying a match between a portion of either the first identifier or the second identifier and a portion of a first venue name of the one or more venue names.

20. The one or more computing devices of claim 15, wherein the one or more venue names are obtained from at least one of a data structure stored within a user device, or a data structure stored within a network server.

* * * * *